United States Patent

[11] 3,575,379

| [72] | Inventor | Pieter F. Hoos |
| | | Greensburg, Pa. |
| [21] | Appl. No. | 846,860 |
| [22] | Filed | Aug. 1, 1969 |
| [45] | Patented | Apr. 20, 1971 |
| [73] | Assignee | Walworth Company |
| | | New York, N.Y. |

[54] ENCAPSULATED PLUG VALVE
6 Claims, 9 Drawing Figs.

| [52] | U.S. Cl. | 251/314 |
| [51] | Int. Cl. | F16k 5/02 |
| [50] | Field of Search | 251/317, 309, 314; 137/375 |

[56] References Cited
UNITED STATES PATENTS

| 2,950,081 | 8/1960 | Steinbuch et al. | 251/317 |
| 3,157,195 | 11/1964 | McIntosh et al. | 137/375 |
| 3,254,872 | 6/1966 | Roos | 251/317X |
| 3,406,707 | 10/1968 | Schenck | 137/375 |

FOREIGN PATENTS

| 647,921 | 9/1962 | Canada | 251/309 |
| 1,353,260 | 1/1964 | France | 251/317 |

*Primary Examiner*—M. Cary Nelson
*Assistant Examiner*—Michael O. Sturm
*Attorney*—Melvin R. Stidham ABSTRACT: A valve with a plug with an outer surface of a resilient, low-friction material. The plug has circumferential bearing and sealing surfaces around the top and bottom thereof on the nominal plug taper, and on each side intermediate its flow ports, a pair of spaced, narrow sealing strips also on the nominal conical surface of the plug extending between, and merging with, the circumferential bearing surfaces. When the plug is in closed position, the sealing strips and surfaces seal around the top and bottom of the plug and body, and on opposite sides of the body port.

Patented April 20, 1971

INVENTOR.
PIETER F. HOOS
BY Melvin R. Stidham
ATTORNEY

INVENTOR.
PIETER F. HOOS
BY Melvin R. Stidham
ATTORNEY

INVENTOR.
PIETER F. HOOS
BY Melvin R. Stidham
ATTORNEY

ENCAPSULATED PLUG VALVE

BACKGROUND OF THE INVENTION

This invention relates to an encapsulated plug valve and, more particularly, to a plug valve wherein the rotatable valve closure plug is encased in a resilient, low-friction material. Prior to encapsulation, the plug is formed with seal bearing surfaces on the nominal plug taper which gradually slope down into recessed areas situated intermediate the valve sealing surfaces.

In conventional tapered plug valves, the port seals are achieved in part by a fairly substantial axial loading on the plug to wedge the plug against the working surfaces in the valve body cavity. Because the wedging action greatly increases the valve operating torque, such valves generally require some lubrication in order to operate them. With the development of plastics having characteristic resilience and low friction, such materials were employed in the formation of sleeves which were interposed between the plug and the body to function as both the sealing and the lubricating media. A material that has been so employed particularly effectively in such lubricating and sealing sleeves is a polytetrafluoroethylene (T.F.E.) or fluorinated ethylene propelene (F.E.P.) which are sold under the trademark "Teflon," by DuPont, and "Halon," by Allied Chemical Company.

Of course, if the sleeve is to function effectively as a seal, its material must not be displaced despite the relative rotation between plug and valve body during valve operation. Moreover, it must adhere or conform to the surface on which it is carried in order to insure that no leakage path may be created behind it. Because T.F.E. and F.E.P. plastics do not have adhesive qualities, sleeves made of such materials have to be locked to the surface either by mechanical means, such as lands or grooves or other interlocking means, or by chemical transformation of the surface into an adhering or bonding structure. Moreover, because the sleeve must have sufficient strength to resist the tendency of the fluid stream to peel it away at its edges from its supporting surface, it must be formed much thicker and more bulky than would normally be desired in order to perform those functions for which the Teflon is selected.

Accordingly, it is an object of this invention to provide an improved rotary plug valve with a yieldable seal means fixed on the plug with no free edges exposed to the fluid stream.

It is a further object of this invention to provide an improved plug valve wherein the plug is completely encased in a relatively thin covering with no edges exposed to the fluid stream.

It is a further object of this invention to provide a plug valve wherein the plug core is formed with extensive recessed areas intermediate full radius bearing and seal support surfaces and then encapsulated with a relatively thin resilient and low-friction material.

It is a further object of this invention to provide a plug valve with an encapsulated plug core formed with nonparallel bearing and seal support surfaces, providing an adjustably wedged seal with accommodation for seal expansion.

Other objects and advantages of this invention will become apparent from the detailed description thereof when read in conjunction with the accompanying drawings.

SUMMARY OF THE INVENTION

In accordance with a preferred embodiment of this invention, the valve body has a tapered body cavity and the plug is cast with a nominal complementary taper. That is, as formed, the nominal taper of the plug core is constituted by circumferential sealing and bearing surfaces around its top and bottom, and four narrow sealing strips, one on each side of each plug flow port, extending from top to bottom to merge with the bearing surfaces. The circumferential sealing surfaces and the upright sealing strips are on a common frustoconical surface. Intermediate these sealing and bearing surfaces and sloping gradually into them, there are large recessed areas so that when the plug is encapsulated and placed under a small axial load in the valve body, firm sealing engagement with the body cavity wall is initially confined to surfaces of the Teflon overlying the frustoconical seal support surfaces. Because of the very gradually sloping transitional surfaces merging the common frustoconical sealing surfaces into the large recessed areas, an increase in the axial load will extend the sealing engagement with the body cavity wall to include circumferential portions of the recessed areas. This controls the area of frictional engagement to be at a minimum, and the recesses provide substantial accommodation for expansion and/or distortion of the Teflon. Preferably, the narrow upright strips are formed immediately adjacent the edges of the plug flow ports so that they are at the extremities of the imperforate flow blocking surfaces between the ports. Hence, when the valve is closed, sealing contacts are initially remote from the body flow port openings, and any distortion or cold flowing of the encapsulating material caused by such sealing contact, even over circumferentially displaced portions of the plug, will not cause the material to invade the flow ports. Because the plug is completely encapsulated, with the covering extending through the flow port as well, there are no edges exposed to the fluid stream. Hence, the covering can be relatively thin.

DESCRIPTION OF A PREFERRED EMBODIMENT

Figure 2:
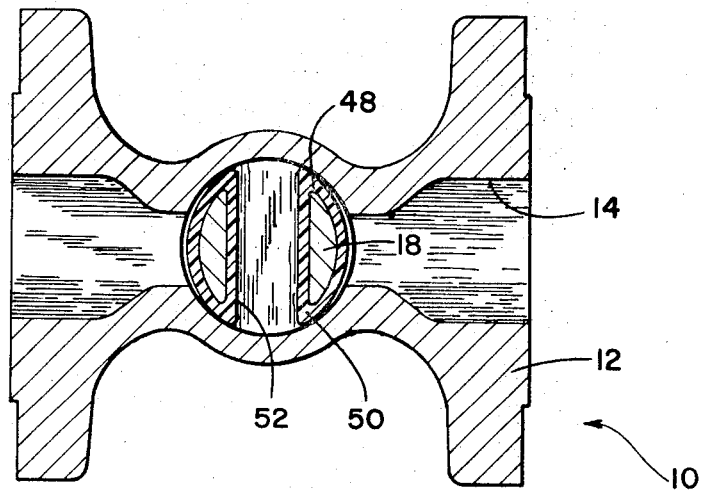
FIG. 2 is a horizontal section line taken along line 2-2 of FIG. 1.
Figure 1:
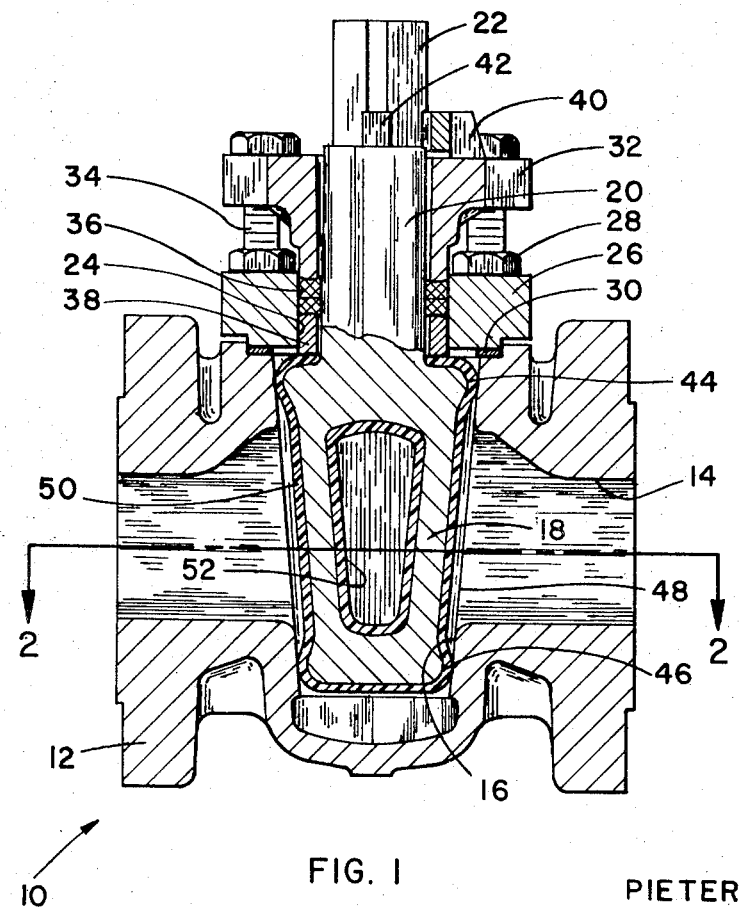
FIG. 1 is a vertical section view of a tapered plug valve embodying features of this invention.

Referring now to FIGS. 1 and 2 with greater particularity, there is shown the plug valve 10 of this invention, including a valve body 12, which is cast or otherwise formed with flow passages 14 and an intermediate tapered body cavity 16 accommodating a plug 18 having a nominal complementary taper. A stem 20 with suitable means, such as a squared end 22, for receiving a handle is cast integral with the plug 18 and extends upward through an opening 24 in the top closure or bonnet 26, which is secured to the valve body as by means of cap screws 28. A gasket 30 or other suitable sealing means is provided between the bonnet 26 and the valve body 12. A packing gland 32 is adjustable along the axis of the stem 20 as by means of studs 34 to compress a packing 36 between it and an opposing ring 38. Stop means 40, 42 may be provided on the packing gland and stem to define the open and closed positions of the plug 18.

The plug 18 is molded or cast with raised top and bottom circumferential sealing and bearing support surfaces 44 and 46 to be described hereinafter in greater detail, and cooperative raised upright sealing strips 48 extending between and merging with the top and bottom circumferential bearing surfaces. The top and bottom circumferential surfaces 44 and 46, and the sealing strips 48 are on a common frustoconical surface defining the nominal conical configuration of the plug 18, and together they effect seals around the flow passages 14, also to be described in greater detail. The plug 18 is molded or completely encapsulated in a relatively thin coating of resilient material 50 with a low coefficient of friction, such as a polytetrafluoroethylene or fluorinated ethylene propelene sold under the trademark "Teflon." The encapsulation of the plug is complete, even extending into and through the flow passage 52 so that there are no free edges of the coating exposed to the flow stream.

Figure 3:
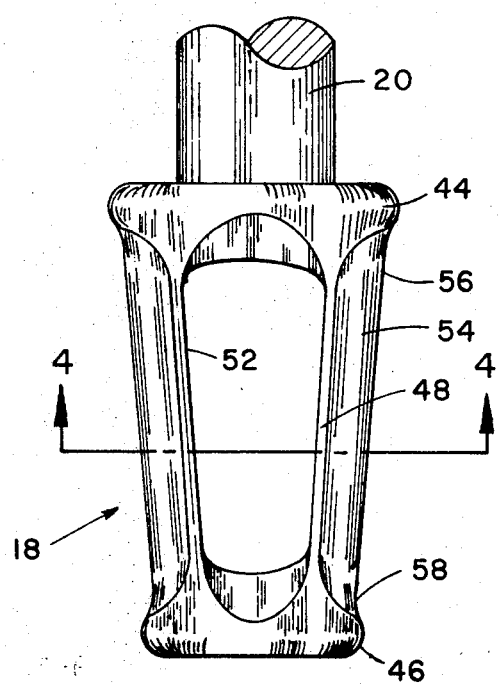
FIG. 3 is a front plan view of the plug core formed in accordance with this invention.
Figure 5:
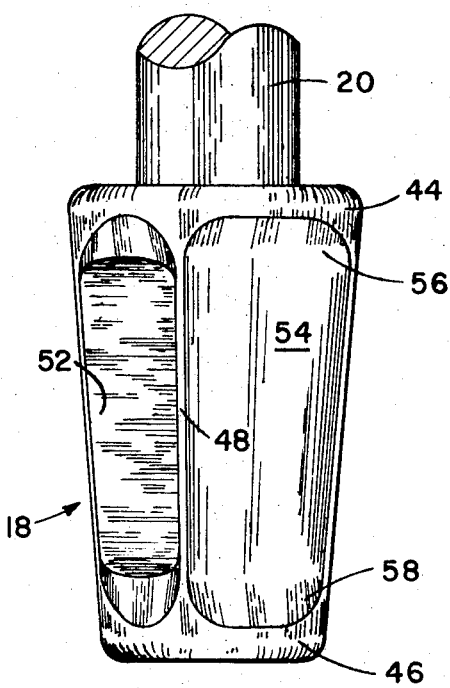
FIG. 5 is a plan view of the plug core taken along 5-5 of FIG. 4.
Figure 4:
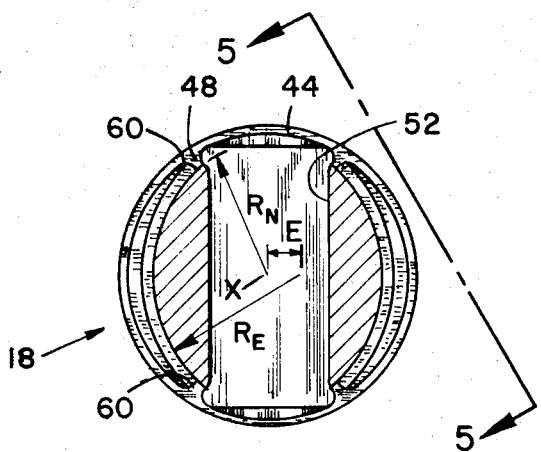
FIG. 4 is a horizontal section view taken along line 4-4 of FIG. 3.

Referring now to FIGS. 3 to 5, there is shown the plug 18 as molded or cast, with top and bottom bearing and sealing surfaces 44 and 46 and upright sealing surfaces 48, all of full size radii to define the nominal frustoconical configuration of the valve plug 18, the upright seal strips 48 are adjacent the flow ports 52 and merge into the upper and lower bearing surfaces 44 and 46 so that together they are adapted to surround the body flow ports 14 when the plug is in closed position and pressurize the encapsulating coating into complete sealing engagement. Intermediate the upright sealing strips 48 and the upper and lower sealing surfaces 44 and 46 are extensive recesses 54 which provide areas to accommodate expansion of the sealing material in which the plug is to be encapsulated or of which it is molded. This is particularly important where a thermoplastic is employed as the encapsulating material, inasmuch as it may have a coefficient of expansion several times that of steel.

The recesses may be formed by tapering the side walls inward at 56 and 58 from the top and bottom bearing surfaces 44 and 46 at angles to the slope of the nominal conical configuration. For example, with a nominal conical slope of 5° with respect to the center line or axis of the cone, satisfactory results have been produced by sloping inward at the top at an angle of 17° from the center line and from the bottom at an angle of 7° at the center line to produce at both top and bottom, slopes of 12° to the nominal cone surface. Laterally, the recess is formed by casting the side surface intermediate the upright sealing strips 48 at radii $Re$ greater than that of the corresponding radii $Rn$ of the nominal cone and from a center, eccentric to that of the cone axis X. Thus, as shown in FIG. 4, the nominal cone configuration is formed on radii represented by the radius $Rn$, to merge at 60 with the recesses 54 formed on larger radii $Re$, about a center disposed more remote from the cone axis X as represented by the distance $E$. With the eccentricity $E$ being greater than the difference in radii $Re-Rn$, the recess surfaces 54 are contained within a projection or continuation of the sealing strips. This will provide a gradually increasing clearance or expansion zone for the accommodation of distortion in the resilient material.

Figure 6:
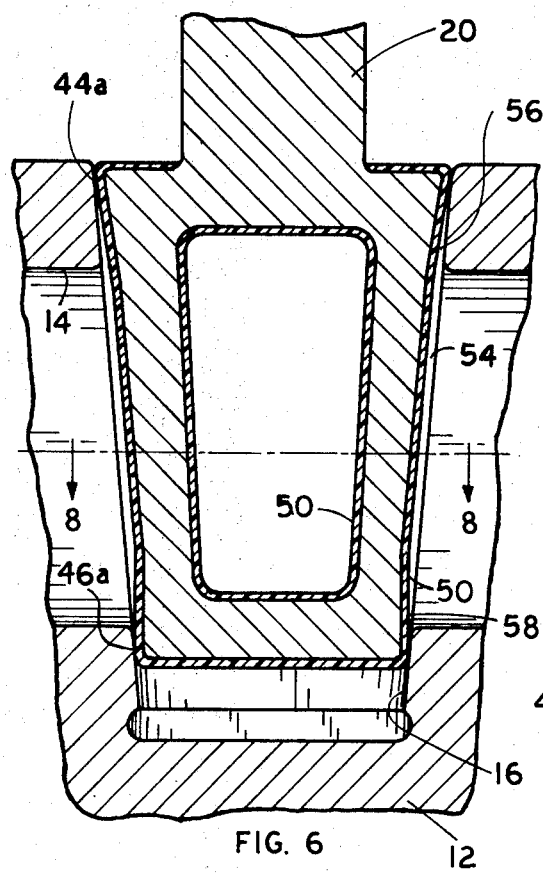
FIGS. 6 and 7 are partial vertical sections through the valve body showing the plug in different axial positions.
Figure 7:
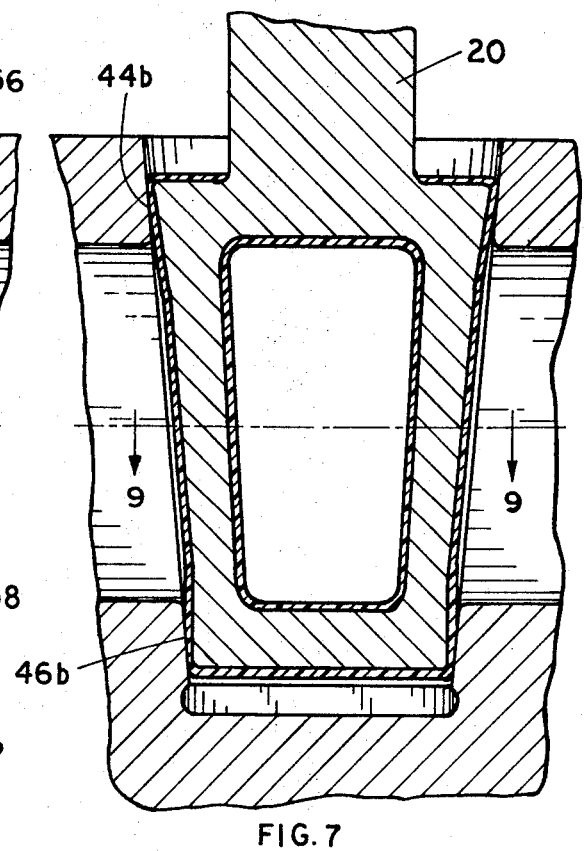
Figure 8:
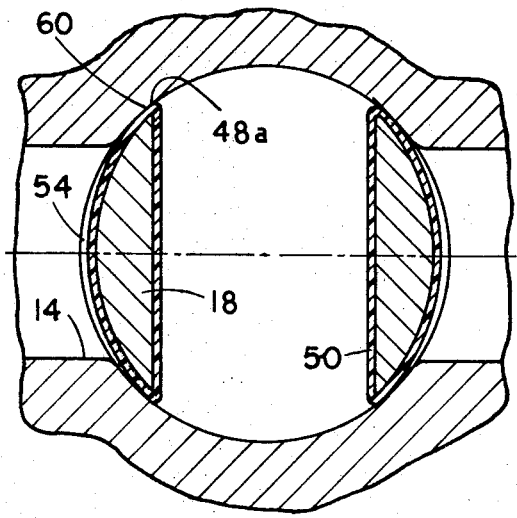
FIG. 8 is a partial section view taken along line 8-8 of FIG. 6.

Referring now to FIGS. 6 and 7, I have shown the valve plug 18 in place in the valve body 12 at different levels of penetration into the body cavity 16. As shown in FIG. 6 under relatively light axial load, the plug rides relatively high in the recess 16, and it contacts the wall of the body cavity over relatively narrow bands around the plug at top and bottom as indicated by 44a and 46a, and surrounding the body flow ports 14a, the contact is virtually restricted to the upright seal surfaces 48 blending into top and bottom bearing surface 44a and 46a. Then, as shown in FIG. 7, the widths of the bands of contact are gradually increased as a function of the load because of the form given to the plug. That is, as the load increases, the distortion of the encapsulating seal will gradually move beyond the merger line 60 of the nominal conical surfaces 48 on the radii $Rn$ and the recessed surfaces 54 on the larger radii $Re$, thus broadening the bands of sealing contact, as shown at 44b and 46b with the upright seal surfaces also being extended in width as shown at 48b in FIG. 9.

A valve working under a relatively small pressure differential between the upstream and downstream passages requires a small amount of deformation of the encapsulating material 50, as exemplified by the narrow sealing bands of FIG. 6, in order to establish an effective, fluid-tight seal. With a tapered plug 18 and bore 16, this sealing deformation may be achieved with a small axial plug load, and the valve operating torque will be relatively small. When the valve is subjected to a high-pressure differential across the plug, the upstream pressure will bias the plug against the body wall on the downstream seat until the area of the sealing bands multiplied by the stresses in the sealing material equals the radial load asserted against the plug. This condition may be stabilized by increasing the axial load on the plug by adjustment of the packing gland 32 (FIG. 1) to wedge the tapered plug deeper into the body cavity 16. In this way, the axial load on the plug may be adjusted accordingly to the operating pressures to which the valve is subjected, and an optimum balance of adequate sealing forces and minimum operating torques may be attained.

Figure 9:
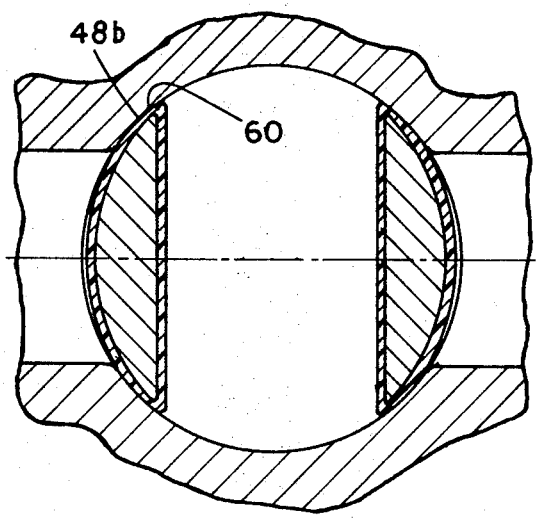
FIG. 9 is a partial section view taken along line 9-9 of FIG. 7.

Referring now to FIGS. 7 and 9, the width of deformed areas 44b, 46b and 48b indicates the location and amount of deformation in the upright sealing bands when the plug is under substantial load. As there shown, the plug is under load in its closed position with the maximum deformation of the coating occurring adjacent the plug ports 52 and, therefore, remote from the flow opening 14 in the valve body. Hence, any cold flow that may result from such deformation has little tendency to cause the material to flow into the body flow passages where it might be sheared in subsequent valve operation.

While this valve has been described in conjunction with a preferred embodiment thereof, it is obvious that modifications and changes may be made thereto without departing from the spirit of this invention.

I claim:
1. A plug valve comprising:
a valve body having inlet and outlet ports and an intermediate body cavity circular in cross section,
a valve plug rotatably mounted in said body cavity,
a transverse flow passageway through said plug for alignment with said body ports in open position of the valve, and an imperforate surface intermediate said flow passageway openings for alignment with said body ports in closed position of the valve,
said imperforate surface being of resilient material,
at any given level between a top level above and a bottom level below said flow passageway openings, upright strips of said imperforate surface adjacent said openings, when undeformed, are coaxial with, and of a radius slightly larger than, the corresponding surface of said body cavity to form sealing strips, said imperforate surface between said strips being contained within a projected circumferential continuation of said sealing strips and being of radius at each level larger than that of said sealing strips, with the center thereof displaced more remote therefrom than the axis of said plug.
2. The plug valve defined by claim 1 wherein:
the amount of displacement of said center from the axis of said plug is greater than the difference between the radii of the intermediate surfaces and sealing bands.
3. The plug valve defined by claim 1 wherein:
there are circumferential bearing surfaces on said plug at levels above said top level and below said bottom level circular in cross section.
4. The plug valve defined by claim 3 wherein:
said circumferential bearing surfaces when undeformed are of slightly larger radii than corresponding levels of the surface of said body cavity.
5. The plug valve defined by claim 3 wherein:
said body cavity is tapered in frustoconical configuration to a smaller diameter at the bottom,
said sealing strips have a complementary taper merging with said circumferential bearing surfaces at top and bottom, and including
transitional portions tapered inward from said bearing surfaces to said intermediate surfaces.
6. A plug valve comprising:
a valve body having inlet and outlet ports and an intermediate body cavity circular in cross section,
a valve plug rotatably mounted in said body cavity,
a transverse flow passageway through said plug for alignment with said ports in open position of the valve,
a coating of resilient material encapsulating said valve plug,
circumferential bearing surfaces around said plug at the top and bottom thereof of a radius at each level slightly larger than the corresponding radius of said body cavity, and a pair of upright convex arcuate sealing strips on said imperforate portions coaxial with said bearing surfaces and extending therebetween and merging therewith, said sealing strips being separated an amount greater than the width of a body port, the radii of said convex sealing strips being slightly larger than corresponding radii of said body cavity, other surfaces of said imperforate portion when undeformed being contained within a projection of said convex sealing strips, said valve cavity being tapered inward from top to bottom in frustoconical configuration, the rotation of said convex sealing strip about the axis of said plug would generate a frustoconical surface with diameters when undeformed slightly larger than corresponding diameters of said body cavity, said imperforate portion intermediate said sealing strips being a conical surface generated by rotation of a similarly sloped line about an axis more remote therefrom than the axis of said plug, and the radius of said intermediate portion at any level thereof being greater than the radius of said sealing strips by an amount less than the displacement of the axis thereof from the axis of said plug.